US007971476B2

(12) United States Patent
Forte et al.

(10) Patent No.: US 7,971,476 B2
(45) Date of Patent: Jul. 5, 2011

(54) METHOD AND DEVICES FOR THE IDENTIFICATION OF VARIOUS PHASES OF AN IONIZATION CURRENT SIGNAL DURING THE COMBUSTION IN AN INTERNAL COMBUSTION ENGINE

(75) Inventors: Pasquale Forte, Orsenigo (IT); Stefano Bordegnoni, Orsenigo (IT); Andrea Gelmetti, Orsenigo (IT)

(73) Assignee: Eldor Corporation S.p.A., Orsenigo (IT)

( * ) Notice: Subject to any disclaimer, the term of this patent is extended or adjusted under 35 U.S.C. 154(b) by 266 days.

(21) Appl. No.: 12/304,704

(22) PCT Filed: Jun. 6, 2007

(86) PCT No.: PCT/EP2007/005015
§ 371 (c)(1),
(2), (4) Date: Apr. 14, 2009

(87) PCT Pub. No.: WO2007/144099
PCT Pub. Date: Dec. 21, 2007

(65) Prior Publication Data

US 2010/0064772 A1 Mar. 18, 2010

(30) Foreign Application Priority Data

Jun. 15, 2006 (IT) .............................. MI2006A1151

(51) Int. Cl.
*G01M 15/04* (2006.01)

(52) U.S. Cl. .................................... 73/114.67; 73/35.08

(58) Field of Classification Search ................. 73/35.01, 73/35.07, 35.08, 114.02, 114.08, 114.58, 73/114.62, 114.67
See application file for complete search history.

(56) References Cited

U.S. PATENT DOCUMENTS

| | | | | |
|---|---|---|---|---|
| 4,417,556 | A | 11/1983 | Latsch | |
| 6,032,650 | A | 3/2000 | Rask | |
| 6,089,077 | A | 7/2000 | Daniels | |
| 7,290,442 | B2 * | 11/2007 | Zhu et al. | 73/114.67 |
| 2004/0084026 | A1 | 5/2004 | Zhu et al. | |

FOREIGN PATENT DOCUMENTS

| | | | |
|---|---|---|---|
| EP | 0 895 076 | A2 | 2/1999 |
| GB | 2 060 062 | A | 4/1981 |
| WO | WO 98/51922 | A1 | 11/1998 |
| WO | WO 2007/042091 | A1 | 4/2007 |

* cited by examiner

*Primary Examiner* — Eric S McCall
(74) *Attorney, Agent, or Firm* — Greer, Burns & Crain, Ltd.

(57) ABSTRACT

The present invention falls into the field of methods and devices for identifying the various phases of the ionization current during combustion in a cylinder of an internal combustion engine.

The present invention develops over various phases comprising the measurement of the ionization current signal and the sampling of the signal within predetermined windows, with the subsequent identification of the sample signal which is preceded by a signal whose derivative has a positive value and followed by a signal whose derivative has a negative value.

6 Claims, 4 Drawing Sheets

[Fig.3]
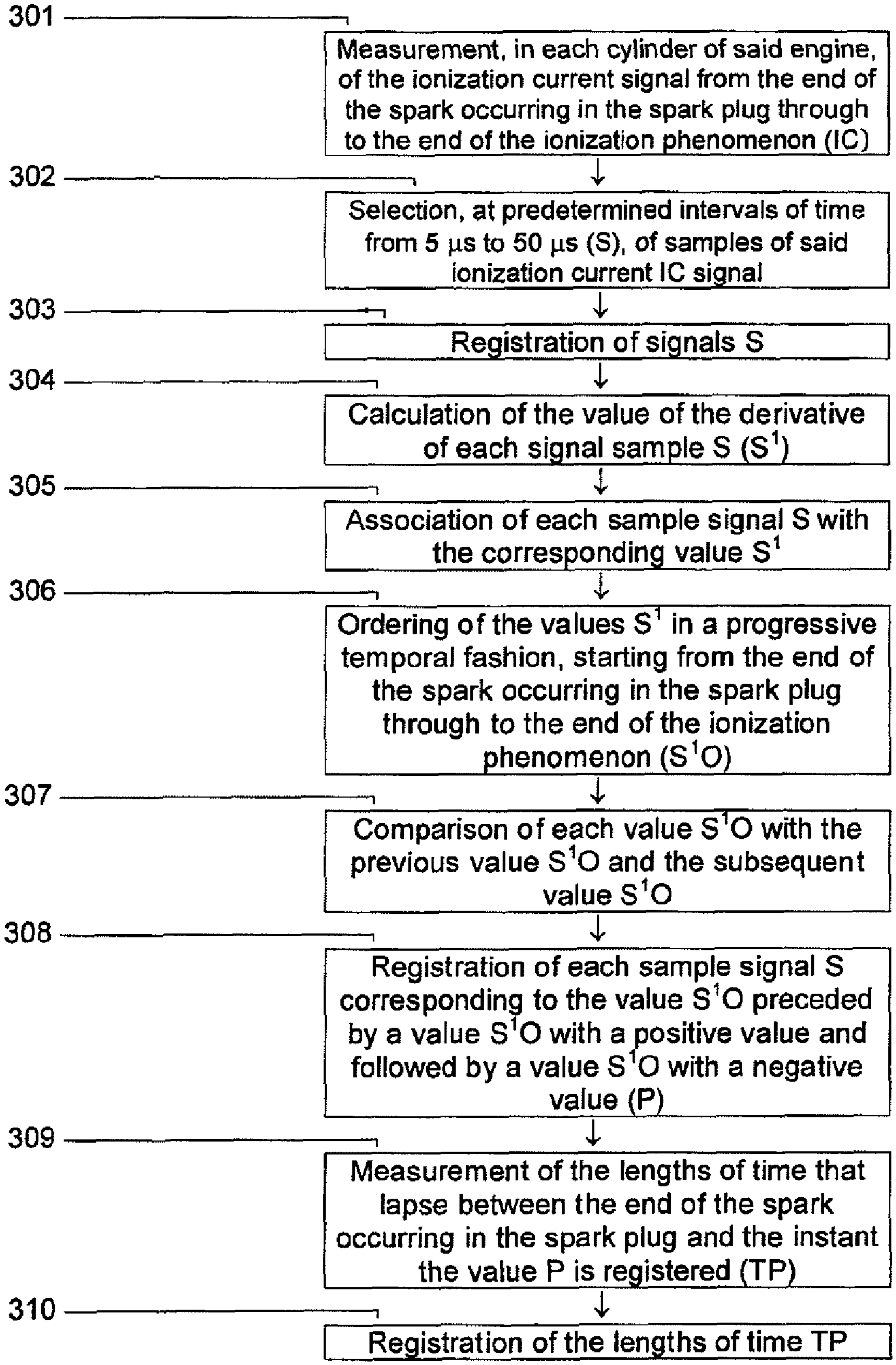

[Fig.4]
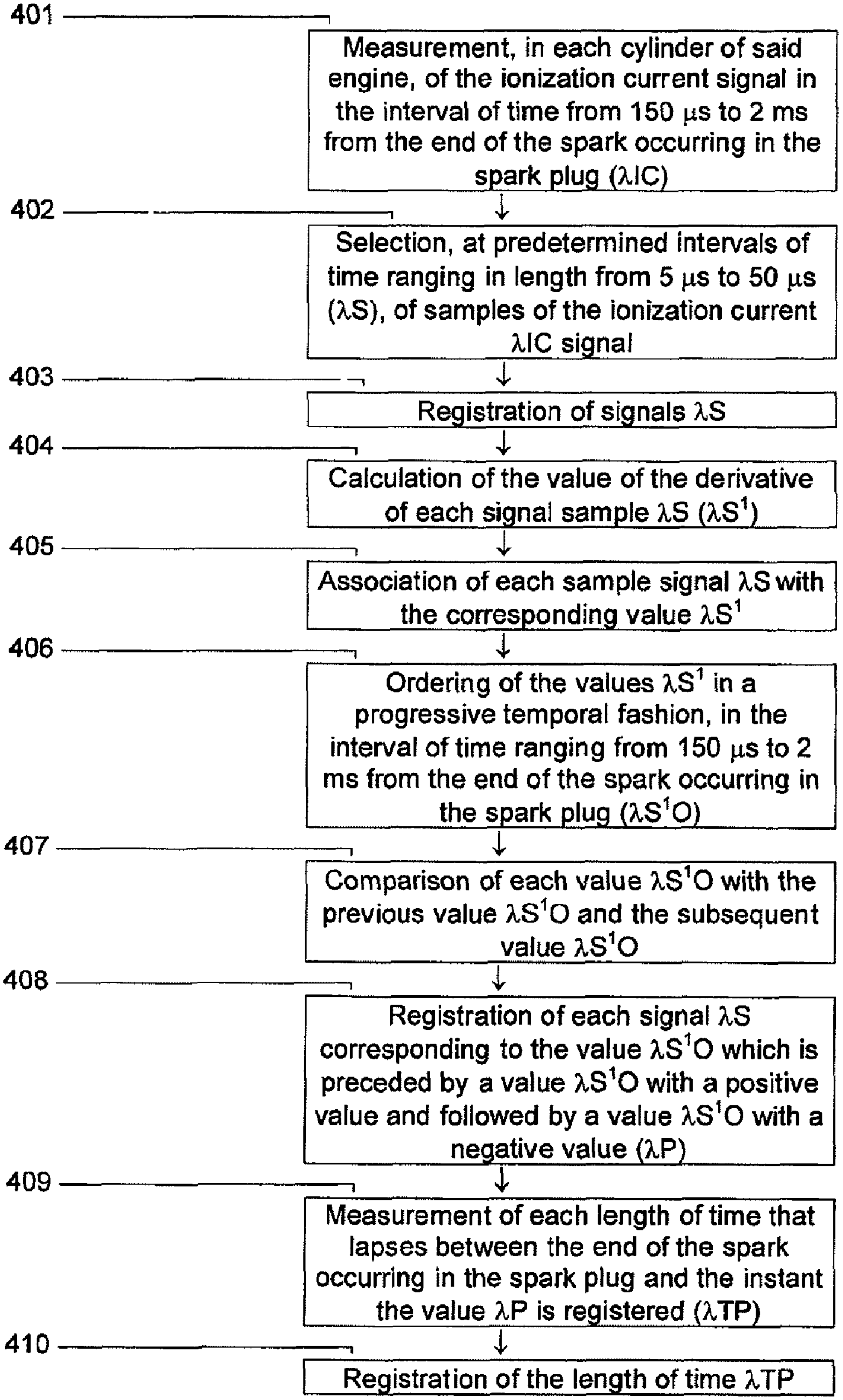

[Fig.5]
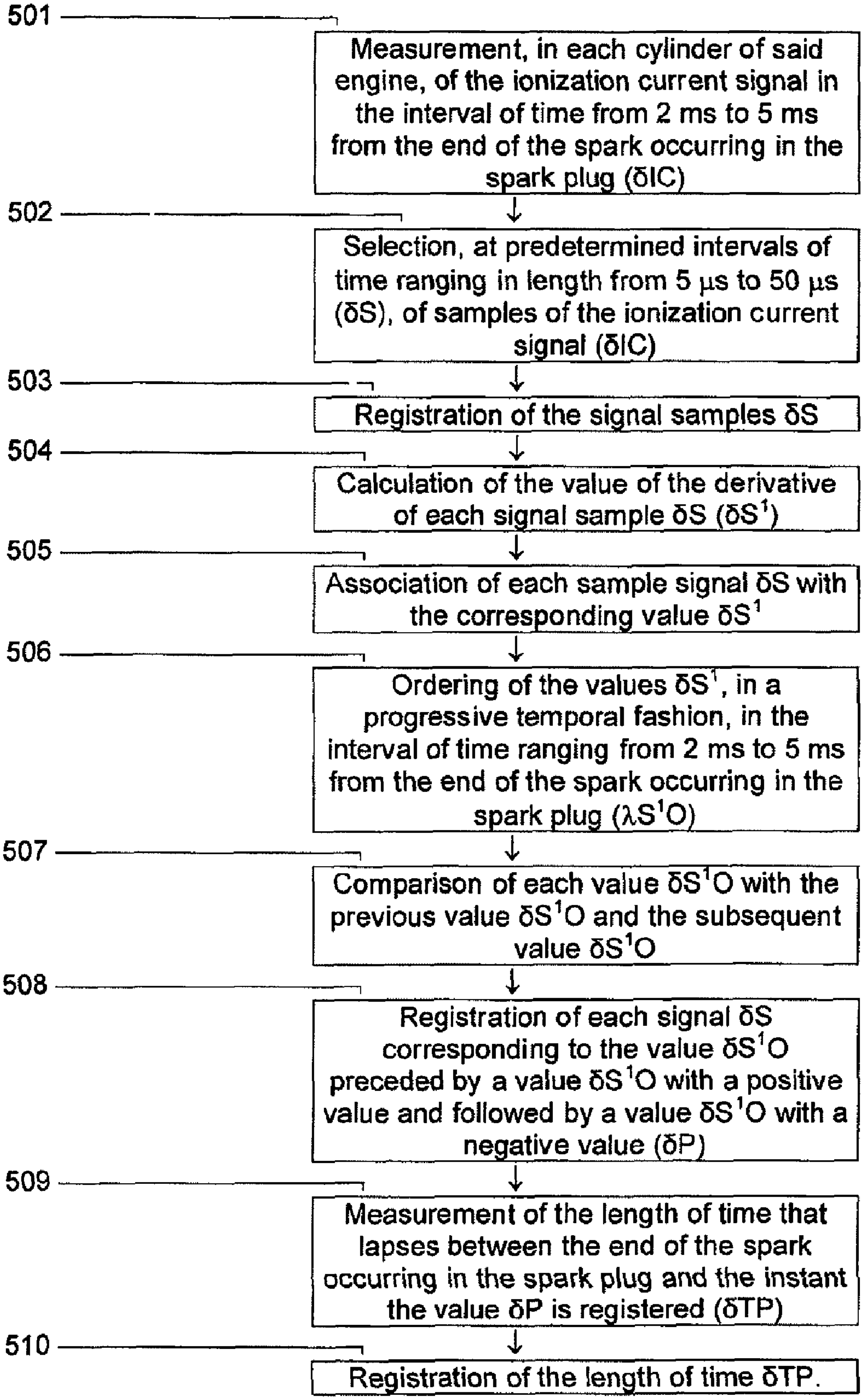

METHOD AND DEVICES FOR THE IDENTIFICATION OF VARIOUS PHASES OF AN IONIZATION CURRENT SIGNAL DURING THE COMBUSTION IN AN INTERNAL COMBUSTION ENGINE

This application is a U.S. National Phase under 35 U.S.C. §371, of International Application No. PCT/EP2007/005015, filed Jun. 6, 2007.

TECHNICAL FIELD

The present invention relates to a method and devices therefor for identifying the various phases of the ionization current released during combustion in a cylinder of an internal combustion engine. The identification of the various phases of the ionization current generated in the combustion chamber of internal combustion engines is of relevant importance for the better functioning of engines for motor vehicles.

BACKGROUND ART

It is known that this identification is utilised to maximise the efficiency of the catalytic converters of said engines to maintain the concentration of exhaust gases of said engines in proximity to a set value, to monitor the air/combustible ratio, to evaluate detonation and to monitor combustion quality in said engines.

The devices and methods currently utilised for said identification are based on the use of sensors, i.e. special circuits able to identify a specific phase of the said ionization current, be it chemical or thermal.

Said currently utilised devices and methods are not, however, able to identify the various phases of said current.

DISCLOSURE OF INVENTION

The aim of the present invention is to identify a method for identifying each of the various phases of the ionization current released during combustion in each cylinder of an internal combustion engine, overcoming the limitations of the currently known methods or devices which are able to identify solely one specific phase of said ionization current.

The present invention is based on the use of the ionization current released by a device located above each cylinder of said engine. Said ionization current is measured by a Control Unit commonly utilised for the management of said combustion engines.

The aims and advantages will better emerge in the description that follows and the plates enclosed, which illustrate, purely in the form of a non-limiting example, an internal combustion engine with a plurality of cylinders:

FIG. 3 illustrates, schematically, the flow chart relating to the method according to the invention in question;

FIGS. 4 and 5 illustrate other flow charts according to embodiments relating to the method of the invention in question.

Figure 1:
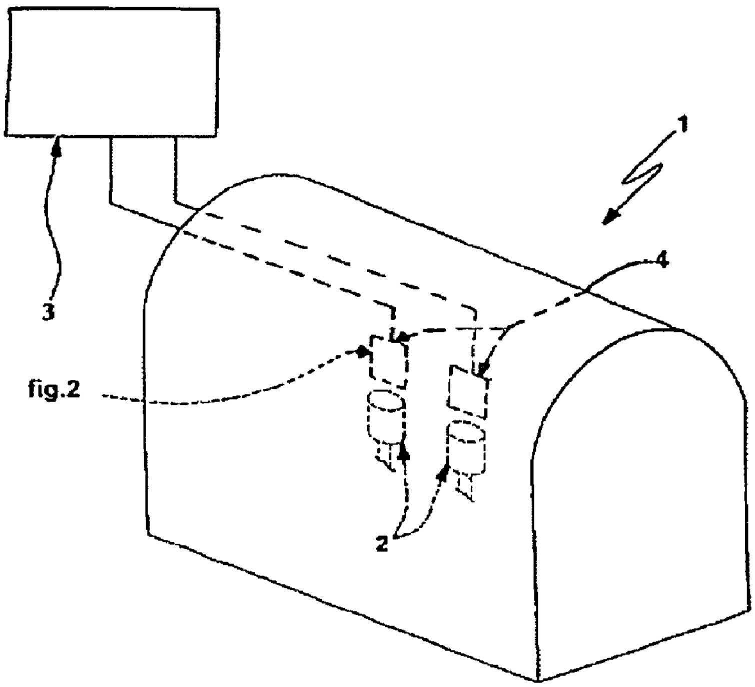
FIG. 1 illustrates a schematic view of the engine which utilises the method, and the Control Unit in which the means that actuate the invention in question are housed.

With reference to FIG. 1, (1) indicates an internal combustion engine as a whole, fitted with one or more cylinders (2), and devices (4) positioned above each cylinder which, in addition to creating—by means of the spark plug—the spark necessary to realise the combustion inside the cylinder, release the ionization current, which is indispensable to actuate the method in question. This figure also shows a Control Unit (3). Devices are located in said Control Unit (not shown graphically) for actuating the method.

Figure 2:
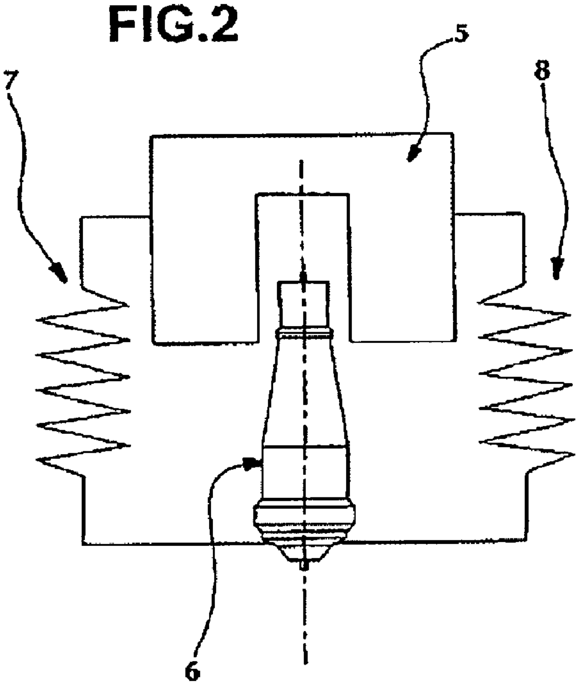
FIG. 2 illustrates a part of the device in question in the present invention, located above the cylinders which, in addition to creating the spark necessary to realise the combustion inside the cylinder, produces the ionization current indispensable for actuating the method in question.

With reference to FIG. 2, said figure indicates the part of the device in question in the invention positioned above the cylinders which, in addition to creating the spark necessary to realise the combustion inside the engine, produces the ionization current, which is indispensable to implement the method in question. This part of the device is constituted of a coil (5) and a spark plug (6). These two elements (5) and (6) are mutually connected by a polarisation circuit (7) and an acquisition circuit (8) connected to the Control Unit (3).

With reference to FIG. 3, said figure indicates a flow chart which schematically illustrates the method in question in the invention. This method develops over various phases: in a first phase (301), the measurement is effected, in each cylinder (2) of said engine (1), of the ionization current signal. This measurement is effected from the end of the spark occurring in the spark plug (6) through to the end of the ionization phenomenon that occurs following combustion of the mixture inside one or more cylinders Identified by a known device (software or hardware) located in the Control Unit (3) and connected to the acquisition circuit. This ionization current measured is called, in the present invention, IC Said ionization current it is measured from the end of the spark being useless the measurement of the ion current during the spark in accordance to experimental tests.

The method continues with a subsequent phase (302) relating to the selection of samples of said ionization current IC signal at predetermined intervals of time within windows which vary in length from 5 μs to 50 μs Said interval of time has been identified by experimental tests being able to have precise representation of the ion current, avoiding to make an excessive number of samples. This sampling is called, in the present invention, S.

The subsequent phase of the method (303) relates to the registration of the signal samples selected during the previous phase (302).

In the subsequent phase of the method (304) the value is calculated of the derivative of each sample S selected in the previous phase (302).

This value is called, in the present invention, $S^1$.

The method continues with the phase (305) in which each sample signal S is associated with the corresponding value $S^1$, which was calculated during the previous phase (304).

The method continues with the phase (306) in which the values $S^1$ are ordered in a progressive temporal fashion, starting from the end of the spark occurring in the spark plug (6) and concluding at the end of the ionization phenomenon. The values $S^1$ ordered in a progressive temporal fashion are called, in the present invention, $S^1O$.

The subsequent phase of the method (307) envisages the comparison of each value $S^1O$ with the previous value $S^1O$ and the subsequent value $S^1O$.

The method continues with the phase (308) comprising the registration of the sample signal S corresponding to the value $S^1O$ which proves to be essentially equal to zero and which is preceded by a value $S^1O$ with a positive value and followed by a value $S^1O$ with a negative value. Each signal registered in the present phase (308) is called, in the present invention, P.

The subsequent phase of the method (309) relates to the measurement of each length of time during which each value P is registered, starting from the end of the spark occurring in the spark plug (6). Each length of time measured is called, in the present invention, TP.

The method concludes with phase 310. In said phase the lengths of time TP are registered.

FIG. 4 illustrates a second embodiment of the invention. It shows a flow chart which illustrates, schematically, the method subject matter of the present invention to identity the maximum peak value of the chemical phase of said ionization current. This method develops over various phases.

In a first phase (401), the measurement is effected, in each cylinder (2) of said engine (1), of the ionization current signal. This measurement is effected in the interval of time running from 150 μs to 2 ms from the end of the spark occurring in the spark plug (6) Said interval of time has been identified by experimental tests being able to identify the entire chemical phase of the ion current. This ionization current measured is called, in the present invention, λIC.

The method continues with a subsequent phase (402) comprising the selection of samples of said ionization current λIC signal at predetermined intervals of time within windows which vary in length from 5 μs to 50 μs Said interval of time has been identified by experimental tests being able to have precise representation of the ion current, avoiding to make an excessive number of samples. This sampling is called, in the present invention, λS.

The subsequent phase of the method (403) relates to the registration of the signal samples selected during the previous phase (402).

In the subsequent phase of the method (404) the value is calculated of the derivative of each sample λS selected in the previous phase (402). This value is called, in the present invention, $\lambda S^1$.

The method continues with the phase (405) in which each sample signal λS is associated with the corresponding value $\lambda S^1$, which was calculated during the previous phase (404).

The method continues with the phase (406) in which the values $\lambda S^1$ are ordered in a progressive temporal fashion, within the interval of time running from 150 μs to 2 ms from the end of the spark occurring in the spark plug (6) being said interval of time has been identified by experimental tests being able to identify the entire chemical phase of the ion current. The values $\lambda S^1$ ordered in a progressive temporal fashion are called, in the present invention, $\lambda S^1O$.

The subsequent phase of the method (407) envisages the comparison of each value $\lambda S^1O$ with the previous value $\lambda S^1O$ and the subsequent value $\lambda S^1O$.

The method continues with the phase (408) comprising the registration of the sample signal λS corresponding to the value $\lambda S^1O$ which proves to be essentially equal to zero and which is preceded by a value $\lambda S^1O$ with a positive value and followed by a value $\lambda S^1O$ with a negative value. Each signal registered in the present phase (408) is called, in the present invention, λP.

The subsequent phase of the method (409) relates to the measurement of the length of time during which each value λP is registered, starting from the end of the spark occurring in the spark plug (6). Each length of time measured is called, in the present invention, λTP.

The method concludes with phase 410. In said phase the length of time λTP is registered.

FIG. 5 illustrates a further embodiment of the invention. It shows a flow chart which illustrates, schematically, the method in question in the invention for identifying the maximum peak of the thermal phase of said ionization current. This method develops over various phases. In a first phase (501), the measurement is effected, in each cylinder (2) of said engine (1), of the ionization current signal. This measurement is effected in the interval of time running from 2 ms to 5 ms from the end of the spark occurring in the spark plug (6). This ionization current measured is called, in the present invention, δIC.

The method continues with a subsequent phase (502) comprising the selection of samples of said ionization current δIC signal at predetermined intervals of time within windows which vary in length from 5 μs to 50 μs Said interval of time has been identified by experimental tests being able to have precise representation of the ion current, avoiding to make an excessive number of samples. This sampling is called, in the present invention, δS.

The subsequent phase of the method (503) relates to the registration of the signal samples selected during the previous phase (502).

In the subsequent phase of the method (504) the value is calculated of the derivative of each sample δS selected in the previous phase (502).

This value is called, in the present invention, $\delta S^1$.

The method continues with the phase (505) in which each sample signal δS is associated with the corresponding value $\delta S^1$, which was calculated during the previous phase (504).

The method continues with the phase (506) in which the values $\delta S^1$ are ordered in a progressive temporal fashion, within the interval of time running from 2 ms to 5 ms from the end of the spark occurring in the spark plug (6) Said interval of time has been identified by experimental tests being able to identify the entire thermal phase of the ion current. The values $\delta S^1$ ordered in a progressive temporal fashion are called, in the present invention, $\lambda S^1O$.

The subsequent phase of the method (507) envisages the comparison of each value $\delta S^1O$ with the previous value $\delta S^1O$ and the subsequent value $\delta S^1O$.

The method continues with the phase (508) comprising the registration of the sample signal δS corresponding to the value $\delta S^1O$ which proves to be essentially equal to zero and which is preceded by a value $\delta S^1O$ with a positive value and followed by a value $\delta S^1O$ with a negative value. Each signal registered in the present phase (508) is called, in the present invention, δP.

The subsequent phase of the method (509) comprises the measurement of the length of time during which each value δP is registered, starting from the end of the spark occurring in the spark plug (6). Each length of time measured is called, in the present invention, δTP.

The method concludes with phase 510. In said phase the length of time δTP is registered.

The description above and the tables enclosed illustrate an embodiment of the present invention and constitute a non-limiting example thereof within the scope of protection of the claims that follow.

The invention claimed is:

1. A method for identifying various phases of ionization current released during combustion in each cylinder of an internal combustion engine fitted with one or more cylinders, having a control unit, and a device to produce the ionization current (IC) located above each cylinder, comprising a coil, a spark plug, a polarisation circuit and an acquisition circuit, wherein said method comprises the following phases:

measurement, in each cylinder of said engine, of the ionization current signal from the end of the spark occurring in the spark plug through to the end of the ionization phenomenon (IC);

selection of samples of said ionization current IC signal at predetermined intervals of time within windows which vary from 5 μs to 50 μs (S);

registration of the signal samples S;

calculation of the value of the derivative of each signal sample S ($S^1$);

association of each sample signal S with the corresponding value $S^1$;

ordering of the values $S^1$ in a progressive temporal fashion, starting from the end of the spark occurring in the spark plug through to the end of the ionization phenomenon ($S^1O$);

comparison of each value $S^1O$ with the previous value $S^1O$ and the subsequent value $S^1O$;

registration of each sample signal S corresponding to the value $S^1O$ which proves to be essentially equal to zero and preceded by a value $S^1O$ with a positive value and followed by a value $S^1O$ with a negative value (P);

measurement of each length of time that lapses between the end of the spark occurring in the spark plug and the instant the value P is registered (TP); and registration of the lengths of time TP.

2. An electronic device comprising means for implementing the method according to claim 1.

3. A method for identifying the maximum peak of the chemical phase of the ionization current released during combustion in each cylinder of an internal combustion engine fitted with one or more cylinders, having a control unit, and a device to produce the ionization current (IC) located above each cylinder comprising a coil, a spark plug, a polarisation circuit and an acquisition circuit, wherein said method comprises the following phases:

measurement, in each cylinder of said engine, of the ionization current signal in the interval of time from 150 μs to 2 ms from the end of the spark occurring in the spark plug (λIC);

selection of samples of said ionization current λIC signal at predetermined intervals of time ranging from 5 μs to 50 μs (λS);

registration of the signal samples λS;

calculation of the value of the derivative of each signal sample λS ($\lambda S^1$);

association of each sample signal λS with the corresponding value $\lambda S^1$;

ordering of the values $\lambda S^1$ in a progressive temporal fashion, in the interval of time ranging from 150μs to 2 ms from the end of the spark occurring in the spark plug ($\lambda S^1O$);

comparison of each value $\lambda S^1O$ with the previous value $\lambda S^1O$ and the subsequent value $\lambda S^1O$;

registration of each sample signal λS corresponding to the value $\lambda S^1O$ which proves to be essentially equal to zero and preceded by a value $\lambda S^1O$ with a positive value and followed by a value $\lambda S^1O$ with a negative value (λP);

measurement of each length of time that lapses between the end of the spark occurring in the spark plug and the instant the value λP is registered (λTP); and registration of the lengths of time λTP.

4. An electronic device comprising means for implementing the method according to claim 3.

5. A method for identifying the maximum peak of the thermal phase of ionization current released during the combustion in each cylinder of an internal combustion engine fitted with one or more cylinders, having a control unit, and a device to product the ionization current (IC) located above each cylinder comprising a coil, a spark plug, a polarisation circuit and an acquisition circuit (8), wherein said method comprises the following phases:

measurement, in each cylinder of said engine, of the ionization current signal in the interval of time from 2 ms to 5 ms from the end of the spark occurring in the spark plug (δIC);

selection of samples of said ionization current δIC signal at predetermined intervals of time ranging from 5 μs to 50 μs (δS);

registration of the signal samples δS;

calculation of the value of the derivative of each sample δS ($\delta S^1$);

association of each signal sample signal δS with the corresponding value $\delta S^1$;

ordering of the values $\delta S^1$ in a progressive temporal fashion, in the interval of time ranging from 2 ms to 5 ms from the end of the spark occurring in the spark plug ($\lambda S^1O$);

comparison of each value $\delta S^1O$ with the previous value $\delta S^1O$ and the subsequent value $\delta S^1O$;

registration of each sample signal δS corresponding to the value $\delta S^1O$ which proves to be essentially equal to zero and preceded by a value $\delta S^1O$ with a positive value and followed by a value $\delta S^1O$ with a negative value (δP);

measurement of each length of time that lapses between the end of the spark occurring in the spark plug and the instant the value δP is registered (δTP); and registration of the length of time δTP.

6. An electronic device comprising means for implementing the method according to claim 5.

* * * * *